(12) United States Patent
Hunt et al.

(10) Patent No.: US 10,116,907 B2
(45) Date of Patent: *Oct. 30, 2018

(54) METHODS, SYSTEMS AND APPARATUSES FOR OPTICALLY ADDRESSED IMAGING SYSTEM

(71) Applicant: THE BOEING COMPANY, Chicago, IL (US)

(72) Inventors: Jeffrey H. Hunt, Thousand Oaks, CA (US); Robert J. Atmur, Whittier, CA (US)

(73) Assignee: THE BOEING COMPANY, Chicago, IL (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/083,823

(22) Filed: Mar. 29, 2016

(65) Prior Publication Data

US 2017/0289506 A1    Oct. 5, 2017

(51) Int. Cl.
*H04N 9/31* (2006.01)
*G02F 1/01* (2006.01)

(52) U.S. Cl.
CPC ......... *H04N 9/3108* (2013.01); *G02F 1/0126* (2013.01); *H04N 9/312* (2013.01)

(58) Field of Classification Search
CPC ..... H04N 9/3108; H04N 9/312; G02F 1/0126
See application file for complete search history.

(56) References Cited

U.S. PATENT DOCUMENTS

| | | | | |
|---|---|---|---|---|
| 3,875,442 A | * | 4/1975 | Wasa | H01J 17/49 313/484 |
| 6,366,388 B1 | * | 4/2002 | Hampp | G02F 1/0126 252/586 |
| 2001/0005114 A1 | * | 6/2001 | Jacobsen | H01J 29/28 313/461 |
| 2006/0132472 A1 | * | 6/2006 | Peeters | G09G 3/02 345/204 |
| 2007/0206258 A1 | * | 9/2007 | Malyak | G02B 26/105 345/204 |
| 2008/0218434 A1 | * | 9/2008 | Kelly | G02B 27/01 345/8 |
| 2013/0094069 A1 | * | 4/2013 | Lee | G03H 1/02 359/3 |
| 2014/0375763 A1 | | 12/2014 | Lee et al. | |

* cited by examiner

*Primary Examiner* — Liliana Cerullo
(74) *Attorney, Agent, or Firm* — Coats & Bennett, PLLC

(57) ABSTRACT

Methods, systems and components are disclosed relating to the exclusive optical addressing of information for image display systems.

17 Claims, 9 Drawing Sheets

METHODS, SYSTEMS AND APPARATUSES FOR OPTICALLY ADDRESSED IMAGING SYSTEM

TECHNOLOGICAL FIELD

The present disclosure generally relates to the field of image display. More particularly, the present disclosure relates to the field of addressed light, particularly optically addressed light for the purpose improving image displays.

BACKGROUND

Images are typically created on a display by electrically addressing light, for example via a spatial light modulator, images are created and changed electronically and projected onto electronic displays. A spatial light modulator (SLM) is an object that imposes some form of spatially varying modulation on a beam of light. Usually a SLM modulates the intensity of the light beam, although devices are known that modulate the phase of the beam or both the intensity and the phase simultaneously. Nevertheless, known imaging devices rely on electronically addressing inputs. Such electrically addressed inputs realize practical limitations relative to scale. That is, for example, known electrically addressed imaging systems must use projection means of a certain minimum size or otherwise realize various system constraints relative to image delivery and performance. This inability to miniaturize imaging systems has restricted the advancement of imaging devices relative not only to size, but also in terms of intensity, resolution, color, etc.

While so-called optically addressed imaging systems are known using optically addressable electrophoretic displays, or optically addressed spatial light modulation, such imaging systems still incorporate electrical components that, again, place scale, quality and other restrictions on the overall imaging system.

BRIEF SUMMARY

The present disclosure relates to methods, systems and apparatuses for exclusively addressing electronic media optically.

According to one aspect, a method is disclosed for addressing a projection system comprising positioning a projection system at a predetermined location, with the projection system comprising a plasma-containing device, positioning an electro-optical device for inputting information via a write beam to the plasma-containing device, positioning the electro-optical device at a predetermined location relative to the plasma-containing device, applying a voltage from a voltage-generating source across the plasma-containing device; generating a plasma in the plasma-containing device, and exclusively optically addressing information via the write beam to the plasma-containing device.

In another aspect, the plasma-containing device comprises a back surface reflective layer and a front surface reflective layer, with both the back surface reflective layer and a front surface reflective layer.

In another aspect, the back surface reflective layer and the front surface reflective layer each having a reflectivity of from about 90% to about 95%.

In a further aspect, the front reflective layer and the back reflective layer each comprise a coating.

In a still further aspect, the information is exclusively optically addressed to the plasma-containing device via a write beam, with the write beam emitted from the electro-optical device.

In yet another aspect, the electro-optical device comprises a laser, and the write-beam is emitted from the laser.

In yet another aspect, the plasma-containing device comprises pixels, with the pixels generated by exclusively optically addressing the plasma in the plasma-containing device with the write beam.

In a further aspect, the pixels are not assigned predetermined locations in the plasma-containing device.

A further aspect comprises imprinting a pixelated array onto an electro-optical device.

Another aspect is directed to a projection system comprising an electro-optical device configured to input information via a write beam to a plasma-containing device, with the projection system output comprising a back surface reflective layer and a front surface reflective layer; a voltage-generating source, with the voltage-generating source in communication with the plasma-containing device; and wherein the information is configured by the electro-optical device to exclusively optically address the plasma-containing device.

An another aspect, the front surface reflective layer and the back surface reflective layer, with each having a reflectivity of from about 90% to about 95%.

In a further aspect, the front reflective layer and the back reflective layer each comprise a coating.

In a still further aspect, the information is optically addressed to the plasma-containing device via a write beam, with the write beam emitted from the electro-optical device.

In yet another aspect, the electro-optical device comprises a laser, and the write-beam is emitted from the laser.

In yet another aspect, the plasma-containing device comprises pixels, with the pixels generated by exclusively optically addressing the plasma in the plasma-containing device with the write beam.

In a further aspect, the pixels are not assigned predetermined locations in the plasma-containing device.

A further aspect comprises imprinting a pixelated array onto the electro-optical device.

In a still further aspect, the pixels are generated exclusively by optically inter-acting the write beam with the plasma in the plasma-containing device.

In a further aspect, the pixels are not assigned predetermined or fixed locations in the plasma-containing device.

Yet another aspect is directed to an object comprising a projection system comprising an electro-optical device configured to input information via a write beam to a plasma-containing device, with the projection system output comprising a back surface reflective layer and a front surface reflective layer; a voltage-generating source, with the voltage-generating source in communication with the plasma-containing device; and wherein the information is configured by the electro-optical device to exclusively optically address the plasma-containing device.

In a further aspect, a stationary object comprises the exclusively optically addressable projection system comprising an electro-optical device for inputting information to a projection system output.

In another aspect, a vehicle comprises the exclusively optically addressable projection system comprising an electro-optical device for inputting information to a projection system.

In further aspects, vehicles that comprise a the exclusively optically addressable projection system comprising an electro-optical device for inputting information to a projection system include a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof Further aspects of the present disclosure are directed to a method for addressing a projection system comprising positioning a plasma-containing device at a predetermined location, with the projection system output comprising a plasma-containing device, and with the plasma-containing device comprising a back surface reflective layer and a front surface reflective layer; positioning at a predetermined location an electro-optical device for inputting information to the plasma-containing device; generating voltage from a voltage source; applying a voltage from the voltage-generating source across the plasma-containing device; generating plasma in the plasma-generating device; generating a write beam from the electro-optical device; exclusively optically addressing the write beam from the electro-optical device to a predetermined location in the plasma-containing device; generating photonic excitation at a plurality of predetermined pixel locations in the plasma-containing device; and assigning colors to pixel locations in the plasma-containing device.

According to a further aspect, in the step of generating the write beam from the electro-optical device, the electro-optical device comprises a laser and the write beam is emitted from the laser.

In a further aspect, in the step of generating photonic excitation, the pixels for a projected image are generated by exclusively optically inter-acting the write beam with the plasma in the plasma-containing device.

A still further aspect is directed to a projection system comprising an electro-optical device configured to generate a write beam, and configured to direct the write beam and configured to input information via the write beam generated in the electro-optical device to a projection system output, with the projection system output comprising a plasma-containing device, and with the plasma-containing device comprising a front surface having a front surface reflective layer and a back surface having a back surface reflective layer; and a voltage-generating source in communication with the plasma-containing device; wherein the information is configured to be provided optically from the electro-optical device to the plasma-containing device and wherein the information is configured to generate photonic excitation at predetermined pixel locations in the plasma-containing device; and wherein colors are assigned to predetermined pixel locations in the plasma-containing device.

In yet another aspect, the electro-optical device comprises a laser and the write beam is configured to emit from the laser.

In still another aspect, the predetermined pixel locations for a predetermined projected image are configured to be generated exclusively by optically inter-acting the write beam with the plasma in the plasma-containing device.

In a further aspect, the write beam from the electro-optical device is configured to exclusively optically address the pixel locations in the plasma-containing device.

In another aspect, the pixels are not assigned predetermined or fixed locations in the plasma-containing device.

In a further aspect, a stationary object comprises the optically addressable projection system comprising an electro-optical device for inputting information to a projection system output.

In another aspect, a vehicle comprises the optically addressable projection system comprising an electro-optical device for inputting information to a projection system output.

In further aspects, the vehicles that comprise the optically addressable projection system comprising an electro-optical device for inputting information to a projection system output system comprise a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface water borne vehicle, an unmanned surface water borne vehicle, a manned sub-surface water borne, an unmanned sub-surface water borne vehicle and combinations thereof In yet another aspect, the present disclosure is directed to a method for addressing a projection system comprising positioning a plasma-containing device at a predetermined location, with the plasma-containing device comprising a back surface reflective layer and affront surface reflective layer; imprinting a pixelated array onto an electro-optical positioning at a predetermined location relative to the plasma-containing device the electro-optical device for inputting information via the write beam to the plasma-containing device; positioning a coherent read beam source configured to generate a read beam; directing the read beam to the plasma-containing device; applying a voltage from a voltage-generating source across the plasma-containing device; generating a plasma in the plasma-containing device; exclusively optically addressing the write beam to a predetermined location in the plasma-containing device; generating photonic excitation at predetermined pixel locations in the plasma-containing device; and assigning colors to pixel locations in the plasma-containing device.

Still further aspects of the present disclosure are directed to a projection system comprising an electro-optical device for inputting information via a write beam to a plasma-containing device, with the electro-optical device comprising a pixelated array imprinted onto the electro-optical device, a voltage-generating source, with the voltage-generating source in communication with the plasma-containing device; and wherein the information is configured by the electro-optical device to be exclusively optically addressed from the electro-optical device to the plasma-containing device to generate photonic excitation at predetermined pixel locations in the plasma-containing device, and wherein colors are assigned to pixels in the plasma-containing device.

In another aspect, the pixels are not assigned predetermined or fixed locations in the plasma-containing device.

In a further aspect, the present disclosure is directed to a method for addressing a projection system comprising positioning, at a predetermined location an electro-optical device for exclusively optically addressing a solid state device; applying a voltage from a voltage-generating source to the solid state device,; generating a write beam in the electro-optical device; generating a read beam from a coherent read beam source; directing the write beam and the read beam to a predetermined location in the solid state device; and generating a pixelated output in the solid state device, wherein the information is exclusively optically addressed from the write beam and the read beam to the solid state device.

In another aspect, the present disclosure is directed to a projection system comprising an electro-optical device configured to produce a write beam and configured to exclusively optically address a solid state device; an electro-optical device configured to produce a read beam; and a voltage-generating source in communication with the solid state device, wherein the write beam and the read beam are configured to generate photonic excitation at predetermined pixel locations in the solid state device.

BRIEF DESCRIPTION OF THE DRAWINGS

Figure 1:
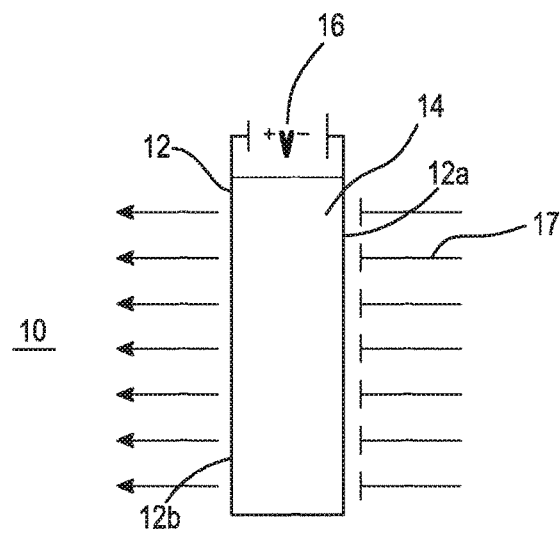
Figure 2:
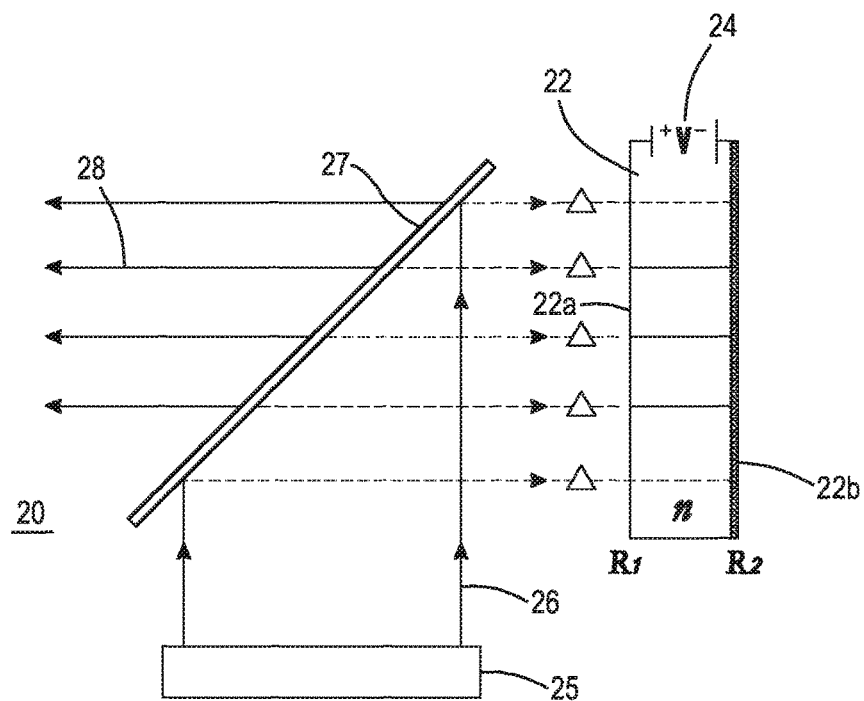
Figure 3:
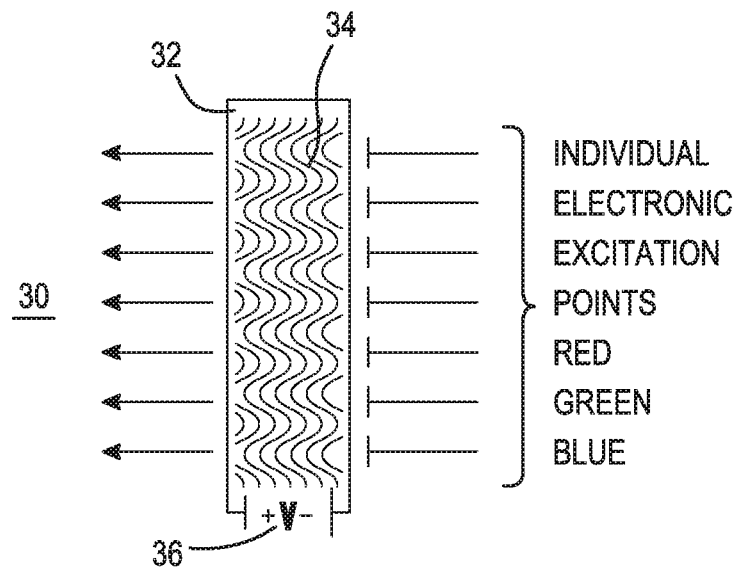
Figure 4:
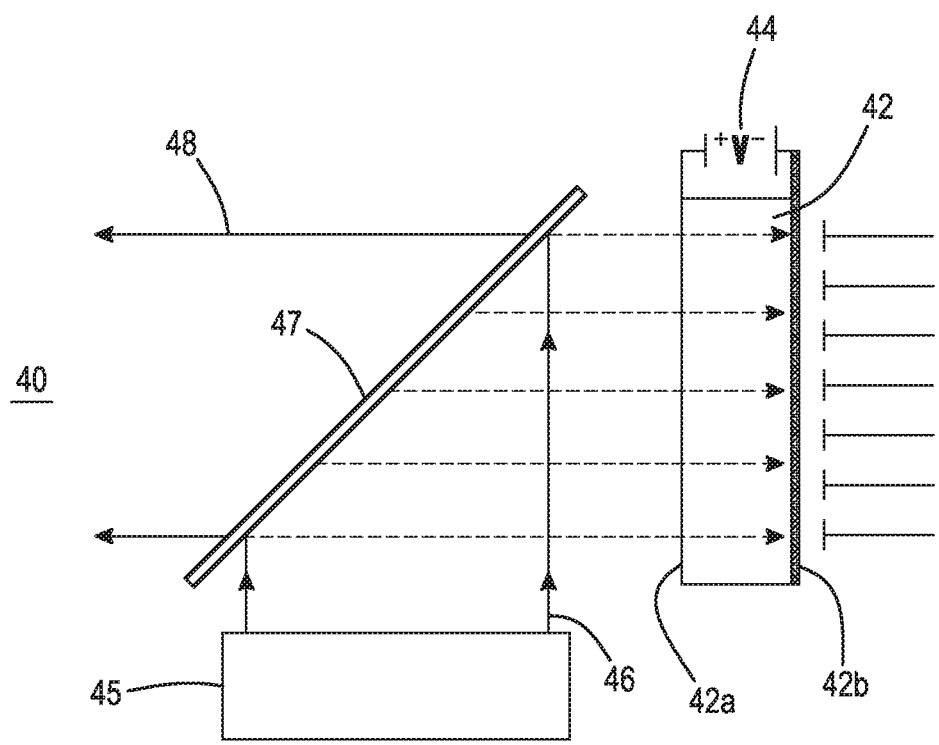
Figure 5:
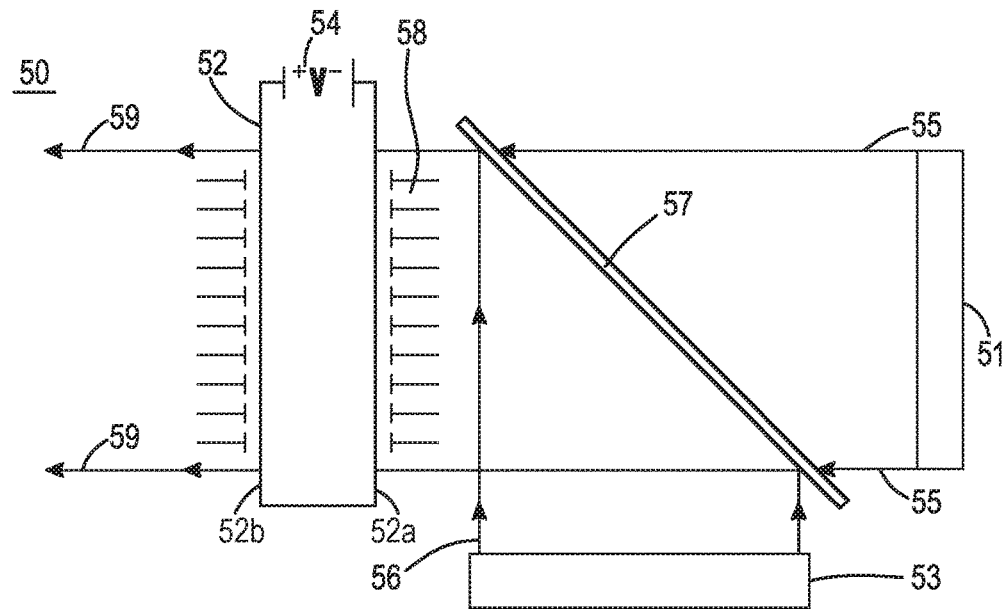
Figure 6:
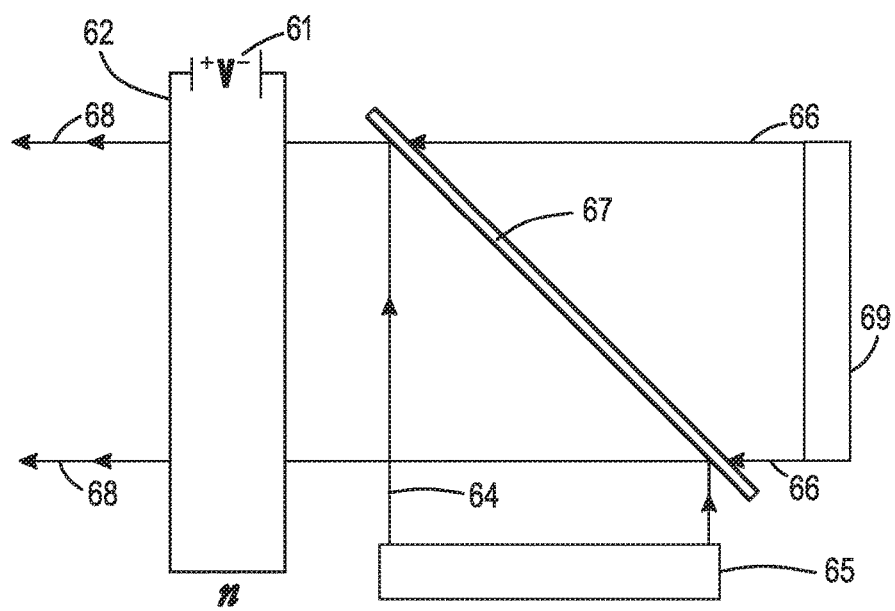
Figure 10:
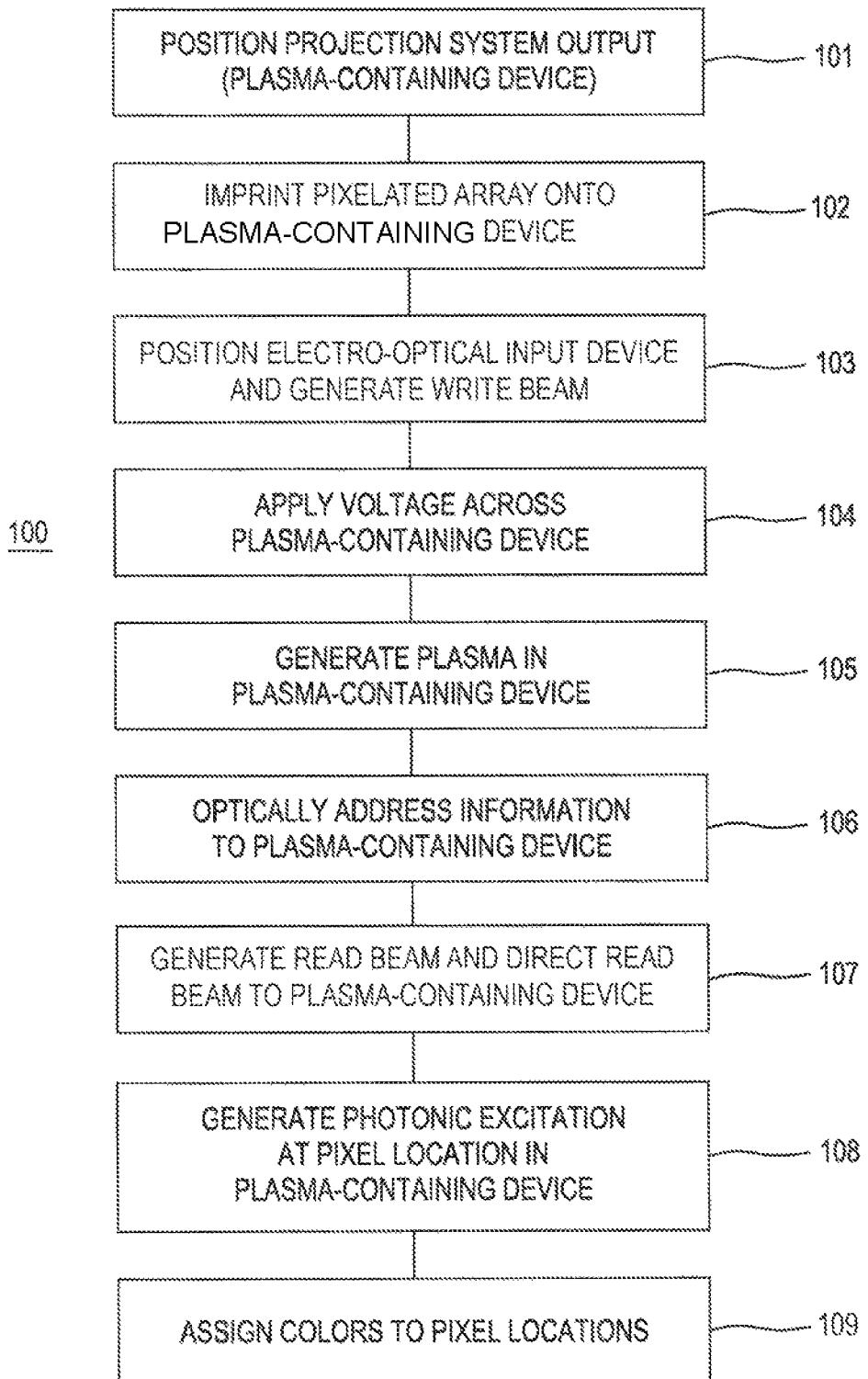
Figure 11:
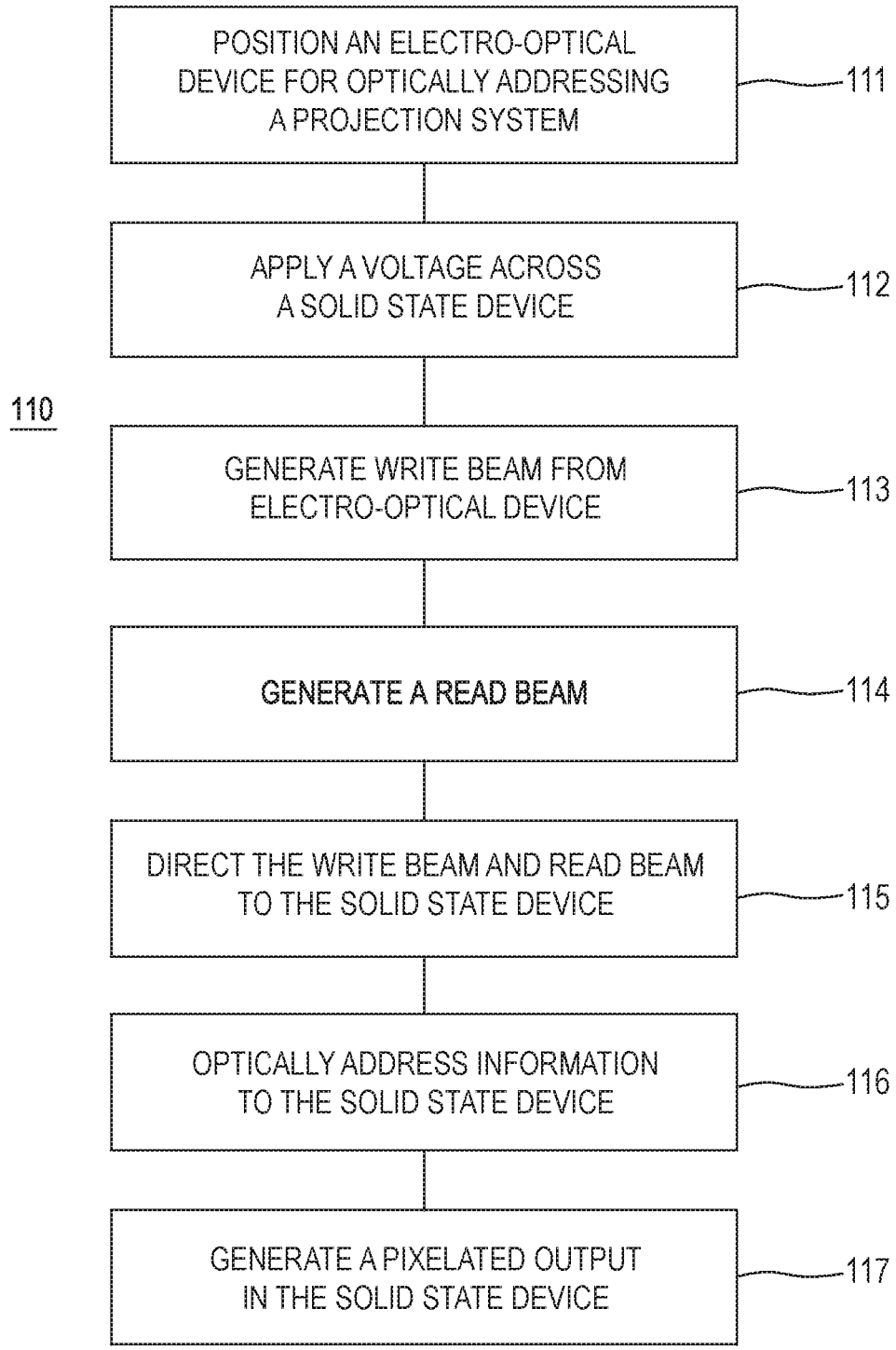
Figure 12:
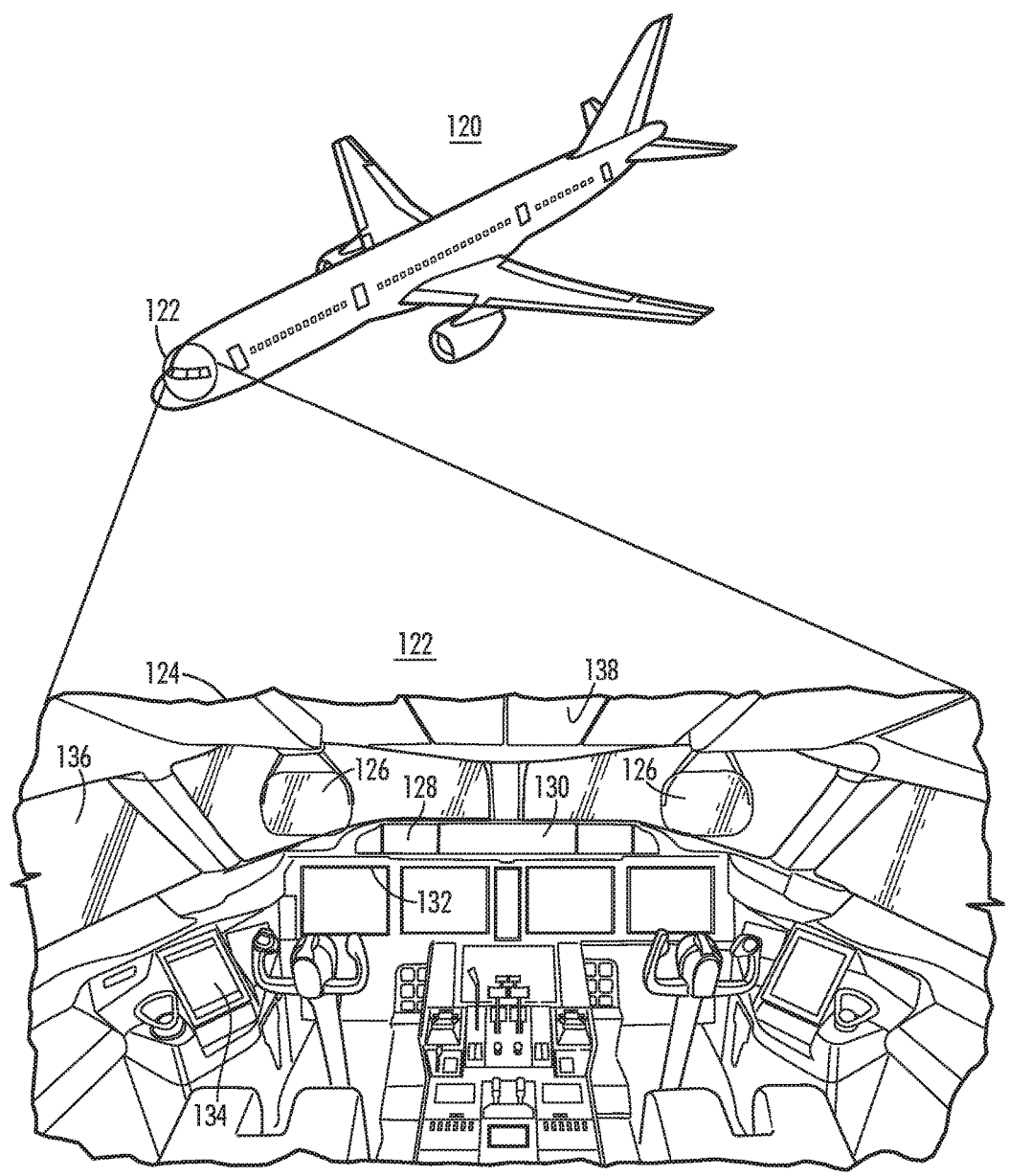

Having thus described variations of the disclosure in general terms, reference will now be made to the accompanying drawings, which are not necessarily drawn to scale, and wherein:

FIG. 1 is schematic diagram of an Prior Art device showing electrically addressing an imaging display;

FIG. 2 is a schematic diagram showing an aspect of the present disclosure where a projection device is optically addressed;

FIG. 3 is a schematic diagram of a Prior Art device showing electrically addressed individual color excitation points in a projection device;

FIG. 4 is a schematic diagram showing an aspect of the present disclosure where a projection device is optically addressed to produce individual color excitation points in a projection device;

FIG. 5 is a schematic diagram showing an aspect of the present disclosure where a projection device is optically addressed to a pre-pixelated projection device;

FIG. 6 is a schematic diagram showing an aspect of the present disclosure where a projection device is optically addressed to a solid state projection device;

FIGS. 7-11 are flowcharts showing various aspects of the present disclosure; and FIG. 12 is drawing of an aircraft comprising a projection display comprising aspects of the present disclosure.

DETAILED DESCRIPTION

An imaging system that is completely optically addressed would significantly improve imaging system flexibility including, but not limited to, image contrast, image quality, image presentation, image accuracy/reproducibility, image variation color selection, image intensity, image resolution (e.g. sharpness), image projection device and display device scale, reduction in device complexity, etc.

Aspects of this disclosure are therefore directed to projection or image-producing methods, systems and apparatuses, including architecture for addressing a plasma-based or solid-state-based projection or image-producing system in an all optical, or exclusively optical fashion. The term "optically addressing" means that the information input to and output from the display (plasma tube or solid-state device) is completely optical (e.g. electromagnetic radiation) in its physical nature. Such exclusively optical addressing is significantly distinct from the known systems where information for image projection and display is provided electronically, with an optical output only. According to aspects of the present disclosure, "optically addressed" information is delivered to a display (e.g. projector, etc.) exclusively optically, and such information is not delivered to a display electrically, as is presently the case with typical display systems.

According to further aspects of the present disclosure, an optical beam, such as, for example, one emitted from a laser, is understood to be a well-defined beam in its propagation characteristics; (e.g. an optical beam having a well-defined wavefront, and well-defined spectral characteristics). While the spectrum does not have to be narrow, the useful spectral characteristics are understood to be substantially constant. While beams emitted from laser sources satisfy the above criteria, non-laser (e.g. non-coherent) sources that satisfy the above criteria are also contemplated according to aspects of the present disclosure.

For example, FIG. 1 shows a schematic representation of a Prior Art projection system 10 showing a device that is electrically addressed. In FIG. 1, a plasma tube 12 is shown in a side view. The volume of this tube contains a gas 14. Such gas 14 has a voltage 16 placed across it. The voltage dissociates enough for electrons from the gas to enable the tube contents to behave as a plasma. In order to generate the individual pixels for projecting an image, individual electrical elements 17 are attached to the back side 12a of the plasma tube 12. While shown as a single row, it is understood such electrical elements may be dispersed in two dimensions (e.g. also perpendicular to the drawing sheet). The electrical elements 17, acting individually, both for position and color, have voltages applied to them. When the voltages are sufficient to dissociate electrons from the gas, the associated electric field will create a current through the plasma, generating a light signal (e.g. the projected image that is emitted from the front side 12b of the plasma tube 12) represented in FIG. 1 as arrows pointing to the left. In this format as shown in FIG. 1 and described above, the plasma tube 12 is said to be "electronically addressed" in the sense that the information concerning the desired image is carried electrically to the plasma tube.

FIG. 2 is a schematic representation of an exclusively optically addressed projection system 20 according to aspects of the present disclosure. In FIG. 2 a plasma tube 22 is shown in a side view having a voltage from a voltage generating source 24 applied across the plasma tube 22. The voltage is applied across the plasma tube 22 to provide a sufficiently large electric field in the plasma tube 22 to generate a plasma. According to the projection system 20, plasma tube 22 comprises a back reflective surface 22b and a front reflective surface 22a. The reflectivities of the surfaces 22a and 22b are based on the desired application and system. However, generally, the reflectivities of the surfaces 22a and 22b are greater than about 90%, and ranging from about 90% to about 99.9%, and more preferably for aspects of the present disclosure from about 90% to about 95%. According to aspects of the present disclosure, if the front and back reflective surfaces of the plasma tube 22 are optically flat and substantially parallel to one another, the plasma tube with surfaces 22a and 22b will behave like a Fabry-Perot interferometer, with a reflected optical pattern generated by interference between the front and back surfaces of the plasma tube 22. It is understood that the optical path length associated with the interference depends upon the index of refraction, "n", of the plasma contained within the plasma tube 22. R1 and R2 refer to the reflectivity values of the front and back surfaces of the plasma-containing device respectively. The values are preferably identical or close to identical to achieve optimal performance. However, the "R" values of the front and back surfaces may vary by up to about 5% from one another. According to this aspect of the present disclosure, a "write" beam 26 is directed from a write beam source 25 to a frequency selective beam splitter 27 that reflects only a predetermined frequency of the write beam 26. The predetermined frequency is selected to be a frequency that can be easily absorbed by the plasma in the plasma-containing device. The frequency depends upon the material present in the plasma. Preferred frequencies according to the present disclosure are typically in the infrared range (e.g. 3 μm or longer) or in the ultraviolet range (e.g.

300 nm or shorter). The infrared values substantially coincide with vibrational excitations in the plasma while the ultraviolet values coincide with electronic excitations. The write beam 26 is created to be "on" or "off" (light or no light) at each x-y position within the cross-section of the write beam 26, depending on the image that needs to be projected. If the write beam 26 is at a frequency where the plasma is strongly absorptive (e.g. in the UV range) the absorption within the plasma will cause a shift in the value of "n", but only at the points (e.g. locations) where there is light in the write beam 26. In this way, the write beam 26 causes a two dimensional modulation in the interference pattern. The change in the interference pattern is then used to establish which plasma pixels will be on and which will be off. As shown in FIG. 2, the projected light from the plasma then exits the projection system to the left as emitted light 28. Since the frequency of the emitted light will be engineered to be lower than the frequency of the write beam 26, it will pass through the beam splitter 27. In this way, the plasma tube is said to be completely and exclusively optically addressed, in that, the pixels for the projected image are created exclusively by the interaction with the write beam. While there is a voltage present, the voltage only "conditions" the tube to generate plasma no information is provided to the system electrically. When the plasma tube is a glass tube, the reflective surfaces of the plasma tube may be added coatings or coating layers comprising a metal oxide coating, with the reflective surfaces also functioning as electrodes for the plasma production in the tube.

With regard to particular examples, the reflective surfaces (22a, 22b) may comprise magnesium oxide, magnesium fluoride, silicon dioxide, tantalum pentoxide, zinc sulfide, titanium dioxide, alone or in combination, etc. Coatings made from these or other materials are contemplated by aspects of the present disclosure and can be used to coat the plasma tube, with the coatings producing a reflectivity ranging from about 90% to about 99.9%, and more preferably, for certain aspects of the present disclosure, from about 90% to about 95%. Such MgO coatings are available from CVI Laser Optics/ CVI Melles Griot, Albuquerque, NM and OCLI (Optical Coatings Laboratory Inc.), Santa Rosa, CA. According to a further aspect, indium tin oxide (ITO) can be used as a coating for a transparent electrode in the plasma containing device. The ITO coating has a reflectivity ranging from about 4% to about 6% (about 95% transmissivity), and can be used in combination with other coatings to produce a desired reflectivity ranging from about 90% to about 95%. Further, when a coating is to be deposited onto the plasma-containing tubes described herein, according to further aspects, the coatings can be deposited onto the tube at thicknesses ranging from about 10 microns to about 100 microns. The plasma tubes may also be made from a material that is itself inherently reflective in the ranges desired.

FIG. 3 shows a schematic representation of a Prior Art projection system 30 showing a device that is electrically addressed. In FIG. 3, a plasma tube 32 is shown in a side view. The volume of this tube contains a gas 34. Such gas 34 has a voltage from a voltage generating source 36 placed across plasma tube 32. The voltage dissociates a sufficient amount of electrons from the gas to enable the tube contents to behave as a plasma. In order to generate three colors, each color pixel must be individually assigned a color and individually electrically addressed to turn it on and off. There is no flexibility as to which colors may be at a given pixel location. Again, the pixels are "preassigned" and cannot be changed. The electronic excitation points must be individually "pre-engineered" to generate one color at a time.

FIG. 4 is a schematic representation of an optically addressed projection system 40 according to aspects of the present disclosure. In FIG. 4 a plasma tube 42 is shown in a side view having a voltage 44 from a voltage generating source (not shown) applied across the plasma tube 42. The voltage 44 is applied across the plasma tube 42 to provide a sufficiently large electric field in the plasma tube 22 to generate a plasma. The projection system outlined in FIG. 4 operates similarly to the system outlined in FIG. 2 above. According to the projection system 40, a back reflective surface 42b is applied to the back of plasma tube 42 and a front reflective surface 42a is applied to the front of plasma tube 42. As with the system shown in FIG. 2, the reflectivities of the front reflective surface 42a and back reflective surface 42b are based on the desired application and system. However, as with the equivalent reflective surfaces disclosed above 22a, 22b, generally, the reflectivities of the reflective surfaces 42a and 42b are greater than about 90%, ranging from about 90% to about 95%, and could go as high as 99% subject only to practical operating parameters of the devices disclosed. According to one illustrative and non-limiting example, the reflective surfaces (42a, 42b) comprise magnesium oxide (MgO) having a thickness ranging from about 10 microns to about 100 microns. The reflectivities selected are controlled by the level of desired contrast in the Fabry-Perot interferometer. If the back and front surfaces 42b, 42a of the plasma tube 42 are optically flat and substantially parallel to one another, the plasma tube will behave like a Fabry-Perot interferometer, with a reflected optical pattern generated by interference between the front and back surfaces of the plasma tube 42. It is understood that the optical path length associated with the interference depends upon the index of refraction, "n", of the plasma contained within the plasma tube 42. According to this aspect of the present disclosure, a "write" beam 46 is directed from a write beam source 45 to a frequency selective beam splitter 47 that reflects only a predetermined frequency of the write beam 46. However, instead of just using the encoded write beam to turn individual pixels on and off, according to the variation shown in FIG. 4, the intensity of each of the x-y positions in the write beam is selectively adjusted. In this variation, there will be additional absorption if the intensity is higher, resulting in different values of the refractive index. The different values of the refraction index will then allow for different colors to predominate in the emitted light 48. As a result a three color projection system is created that has been exclusively optically addressed. The excitation or "write" beam enters the plasma tube and is optically coupled into the plasma tube. Photonic excitations, such as local heating, etc. will induce local changes in the refractive index, "n", within the plasma tube. Macroscopic reflective surfaces 42a and 42b allow the enhancement or "read" changes in the refractive index. The emitted light will travel and behave similarly to that shown in FIG. 2. Alternately, the write beam 46 could exit the plasma tube from the opposing side. Since the positioning of the write beam 46 defines the locations of the individual pixels, individual color responses can be assigned to the write beam 46 individually without any pre-engineering of the excitation medium. Preengineering refers to the process, in the field of electronic projection devices, where the excitation material must be grown into individual pixels. This is contrast to aspects of the present disclosure where the pixels are defined "post-engineering", and where the write beam provides the information required as to the size, location, number, etc. of the pixels (well after the point in time where the image display system has been constructed). In addition and importantly, colors can be changed in real time by changing the assignment in the write beam 46 or read beams. Such flexibility was not possible with pre-pixelated excitation points required with previously known electronically addressed projection systems.

According to another aspect, local application of electric fields can enhance nonlinear optical coupling of the write beam to the plasma, such as, for example by removing the center of inversion that exists in a gas medium. Non-linear effect, such as phase modulation relies less on the write beam. That is, the primary information for certain projection systems will still be carried by the write beam, but certain specific optical effects will be supported, in part, by locally applied electric fields, even though such electric fields do not, themselves, provide any imaging information. In other words, this variation is directed to applications where it may be necessary to have a plasma tube that has a pre-pixelated array imprinted thereon. In these instances it may be necessary (due to speed) to optically address the system, but have well defined pixels already in place.

An illustrative projection system 50 is shown in the schematic representation provided as FIG. 5. A plasma tube 52 has a voltage from a voltage generating source 54 applied across the plasma tube 52 comprising back reflective surface 52a and front reflective surface 52b. However, as with the equivalent reflective surfaces disclosed above 22a, 22b, generally, the reflectivities of the reflective surfaces 52a and 52b are greater than about 90%, ranging from about 90% to about 95%, and could go as high as 99% subject only to practical operating parameters of the devices disclosed. According to one illustrative and non-limiting example, the reflective surfaces (42a, 42b) comprise magnesium oxide (MgO) having a thickness ranging from about 10 microns to about 100 microns. A write beam 56 generated from an electro-optical device 53 is coupled into the path of the projection, or "read" beam 55 (generated from a projected beam source 51) with a frequency selective beam splitter 57. Small electronic connections 58 are shown to the right side of the plasma tube 52. The electronic connections 58 define individual pixels. The write beam 56 modifies the local refractive index as stated above. In this variation, however, care is taken to register the information pixels in the write beam with the electronically connected pixels. The projected image is shown propagating through the beam splitter 57 and through the plasma tube 52. The write beams 56 and read beams 55 combine in the plasma tube 52 to form beam 59. As mentioned above, this variation is specific to situations where it is desirable or necessary to locally control the electric field applied to the plasma tube. Such flexibility may be needed because a particular imaging application requires a stronger non-linear interaction in one area than another. As a result, the effect of the write beam on the refractive index of the material in the plasma tube may require enhanced nonlinearity. In such cases, local electronic pixilation will increase the strength of the non-linear interaction, leading to an enhanced effect on the projected read beam. Such a protocol could also be used to compensate for inconsistencies within either the write beam or read beam, thus alleviating the need for additional optics that could be required to produce a clean wavefront.

In this way, the plasma tube is said to be completely optically addressed, in that, the pixels for the projected image are created exclusively by the interaction with the write beam. While there is a voltage present, the voltage only conditions the tube to generate plasma and "condition" the plasma tube and no information is provided to the system electrically.

FIG. 6 depicts a projection system 60. As shown in FIG. 6, a write beam 64 and a read beam 66 are combined by an optical element, such as a beam splitter 67 and then transmitted to a solid state device 62 having an applied electric field or voltage 61. The write beam 64, generated from an electro-optical device 65, has a frequency selected to primarily transmit through the solid state device 62 while the projection, or read beam 66, generated from a projection, or "read" beam source 69 interacts with the solid state device 62. As the two beams are present simultaneously in the solid state device 62 and emerge from the solid state device 62 as emitted light 68, the write beam 64 is able to instantaneously encode its information on to the read beam 66. In addition, the non-linear interaction of the write beam 64 may be controlled on a pixel by pixel basis. As a result, the projection system 60 as illustrated in FIG. 6 creates a projected beam that can instantaneously adopt the characteristics of the write beam in a system that is exclusively optically addressed. Throughout the present specification, the terms "projection beam" and "read beam" are used equivalently, and therefore are understood to be equivalent terms. According to further aspects, the solid state device may be substituted with another image projection component (e.g. a plasma-containing device).

FIGS. 7-11 are flowcharts showing various aspects of the present disclosure. The following flowcharts disclose methods that may be used with various exemplary systems disclosed above.

Figure 7:
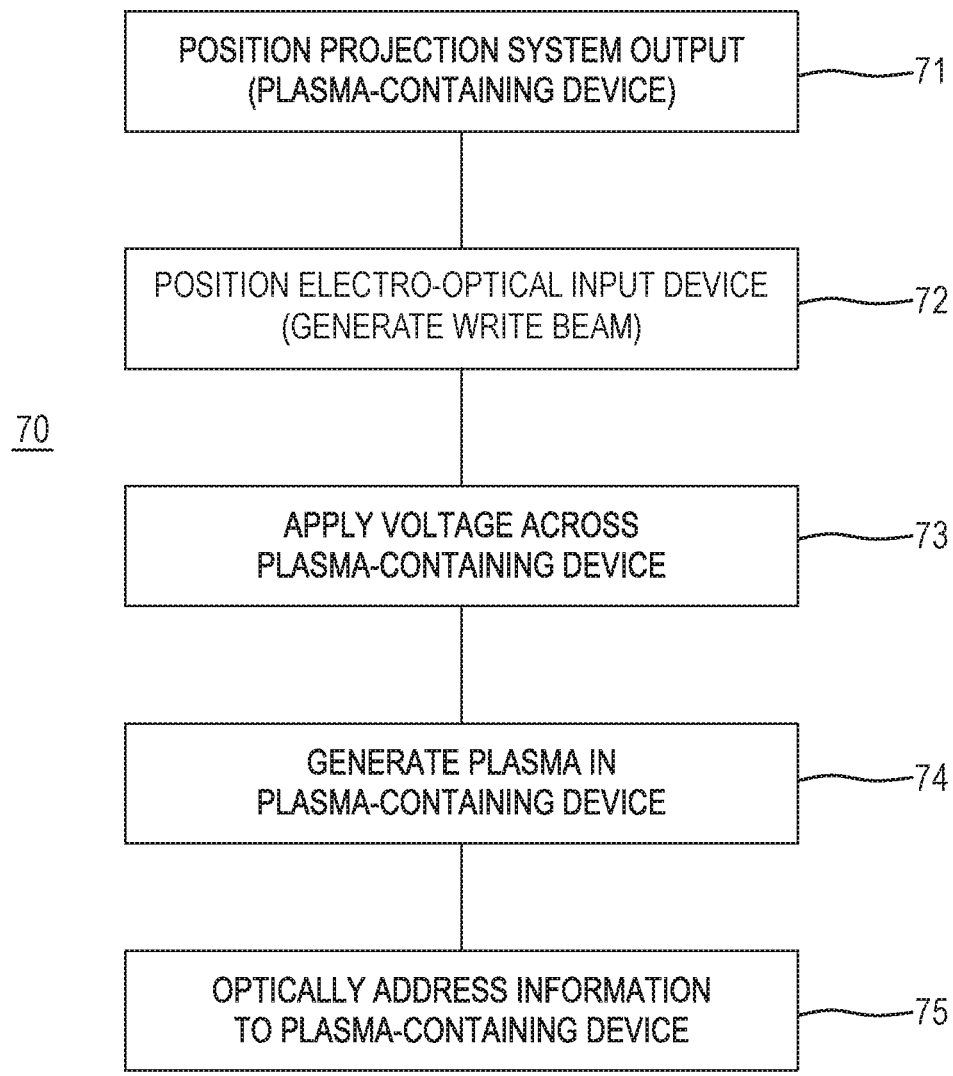

As shown in FIG. 7, aspects of the present disclosure are directed to a method 70 for addressing a projection system comprising positioning a projection system output (plasma-containing device) 71, positioning an electro-optical input device to generate a write beam 72, applying voltage across the plasma-containing device 73, generating plasma in the plasma-containing device 74, and optically addressing information to the plasma-containing device 75.

Figure 8:
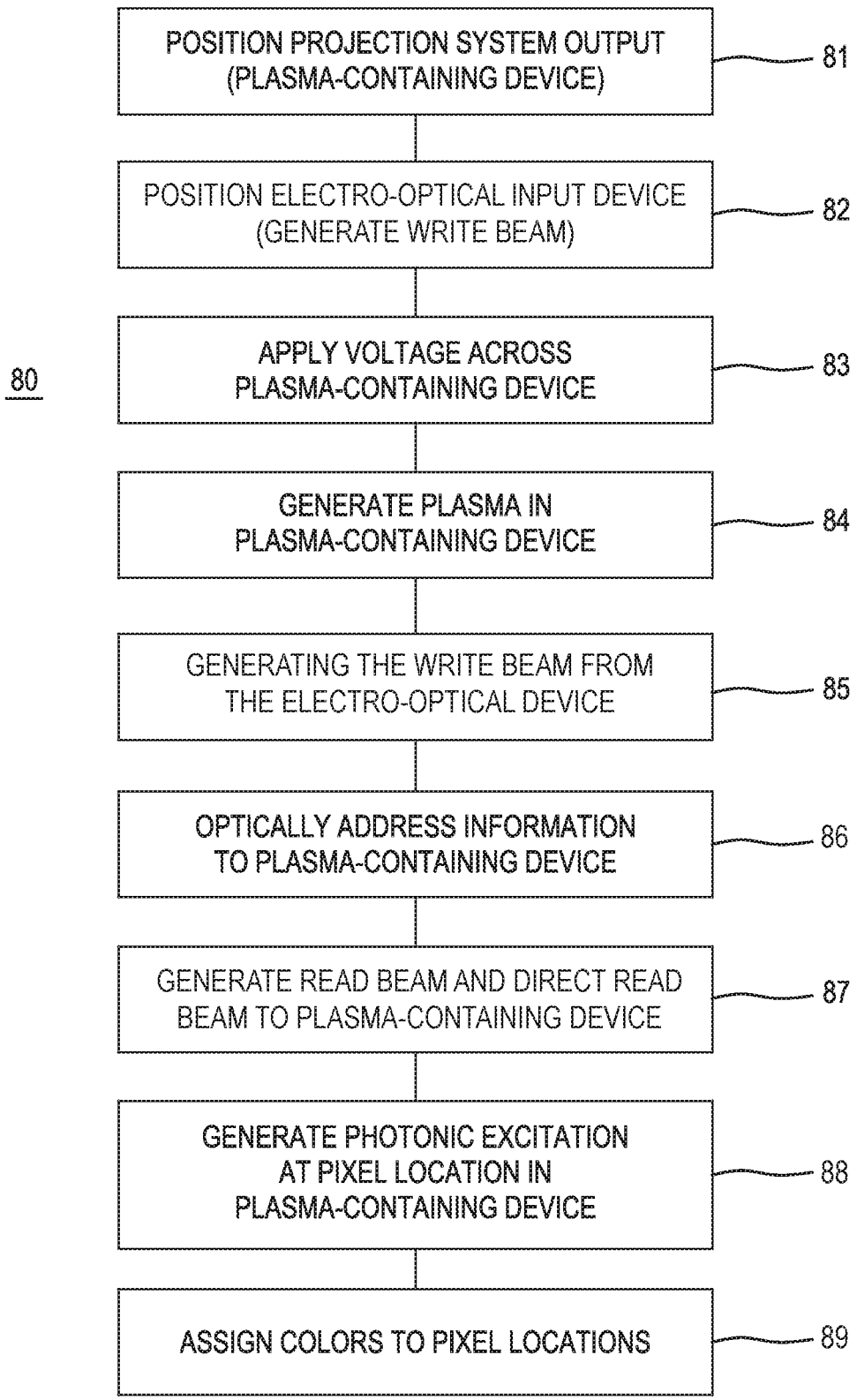

As shown in FIG. 8, aspects of the present disclosure are directed to a method 80 for addressing a projection system comprising positioning a projection system output (e.g. plasma-containing device) 81, positioning an electro-optical input device to generate a write beam 82, applying voltage across the plasma-containing device 83, generating plasma in the plasma-containing device 84, generating the write beam from the electro-optical device 85, optically addressing information to the plasma-containing device 86, generating a read beam and directing the read beam to the plasma-containing device 87, generating photonic excitation at pixel locations in the plasma-containing device 88, and assigning colors to pixel locations 89.

Figure 9:
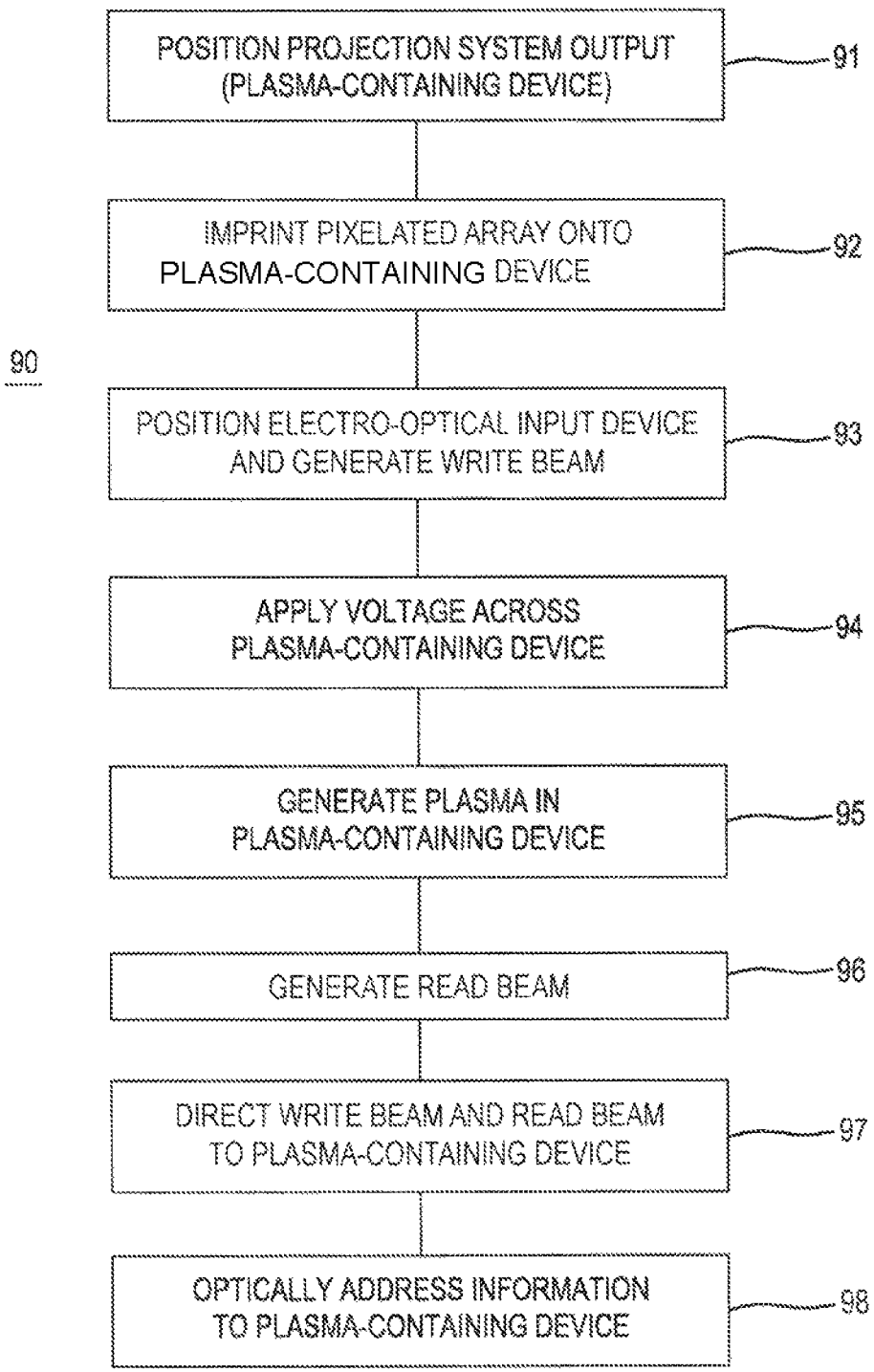

As shown in FIG. 9, aspects of the present disclosure are directed to a method 90 for addressing a projection system comprising positioning a projection system output (e.g. plasma-containing device) 91, imprinting a pixelated array onto a plasma-containing device 92, positioning an electro-optical input device to generate a write beam 93, applying voltage across the plasma-containing device 94, generating plasma in the plasma-containing device 95, generating a read beam 96, directing write and read beams to plasma-containing device 97 and optically addressing information to the plasma-containing device 98.

As shown in FIG. 10, aspects of the present disclosure are directed to a method 100 for addressing a projection system comprising positioning a projection system output (e.g. plasma-containing device) 101, imprinting a pixelated array onto a plasma-containing device 102, positioning an electro-optical input device to generate a write beam 103, applying voltage across the plasma-containing device 104, generating plasma in the plasma-containing device 105, optically addressing information to the plasma-containing device 106, generating a read beam and directing the read beam to the plasma-containing device 107, generating photonic excitation at pixel locations in the plasma-containing device 108, and assigning colors to pixel locations 109.

As shown in FIG. 11, aspects of the present disclosure are directed to a method 110 for addressing a projection system comprising positioning an electro-optical device for optically addressing a projection system 111, applying voltage across a solid state device 112, generating a write beam from an electro-optical device 113, generating a read beam 114, directing the write beam and the read beam to the solid state device 115, optically addressing information to the solid state device 116, and generating a pixelated output from the projection system output 117.

The variations and alternatives of the present disclosure relate to the manufacture and use of components and parts such as, for example, component parts of various dimensions. Such devices include, but are not limited to, components and parts, particularly components and parts for image displays that may be positioned, for example, on the exterior or interior of stationary objects including, without limitation, building interiors and exteriors, bridge trusses, support columns, general construction objects, etc. Further objects include, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects, and combinations thereof FIG. 12 is a drawing of an aircraft 120 with enlarged section 122 showing an internal view of a cockpit's instrument displays. As shown in FIG. 12, an aircraft 120 comprises a forward section 122. Section 122 is also shown from an interior view to contain a cockpit 124 having multiple locations for display components, the components shown as parts 126, 128, 130, 132, 134, 136, 138. Indeed, according to aspects of the present disclosure, in an aircraft cockpit, such as that represented generally in FIG. 12, almost any surface may incorporate an information display, including an image display resulting from exclusively optically addressed information. Such displays may be designed to be displayed on any interior or exterior surface, including output displays, windows, opaque surfaces, etc.

Aspects of the present disclosure contemplate image projection methods, systems and apparatuses comprising plasma-containing or solid state devices. Such plasma-containing devices non-exhaustively include plasma based display monitors, and other partially ionized gas-based systems, gas-discharge-based systems, etc., including support structures, such as glass, which are transparent at write and projection wavelengths. Aspects of the present disclosure further contemplate image projection methods, systems and apparatuses comprising solid state devices. Such devices non-exhaustively include semiconductor materials, semiconductor layers, etc.

Read beams contemplated by the aspects of the present disclosure may be generated by coherent sources including, without limitation, lasers. The coherent read beam sources may be any sources that provide a frequency in the visible spectrum (e.g. about 770 nm and 300 nm).

Further aspects of the present disclosure contemplate write beams generated by electro-optical devices including, but not limited to lasers, coherent sources such as lasers, partially coherent sources, such as light emitting diodes (LEDs), other light emitting semiconductor materials, or other light sources based on Amplified Stimulated Emission, and non-coherent sources, such as incandescent optical sources, fluorescent sources, or other thermal-excitation based optical sources.

The present disclosure further contemplates suitable equivalent voltage-generating apparatuses to provide the voltages required to generate plasma in plasma-containing devices. Such voltage generating devices include, without limitation voltage-based supplies, current-based supplies, limited power-based supplies, or combinations thereof, and almost any devices capable of generating useful voltages of from about 100 volts to about 10000 volts, more particularly almost any devices capable of generating useful voltages of from about 500 volts to about 1000 volts.

According to a contemplated aspect, in practice, to achieve the desired, displayed images by exclusively optically addressing the required information to a display output, the write beam and the projection beam are co-aligned. The write beam and projection beam are combined in an appropriate optic, (e.g. a device that transmits one beam while reflecting the other, for example, a dielectric film optic, etc.). Once the beams are combined, they are propagated to the plasma device. Since the system is optically addressed, there is no need to "register" the combined beams with any particular location on the plasma device. The projected beam exits and can either be projected at a screen (with suitable enlargement) or kept small for a smaller display, such as, for example, a cockpit avionics display, etc. According to further aspects, the optically addressed information may take the form of displayed images of almost any desired configuration including, but not limited to images having almost any desired color, or multiple colors, or shades of colors, etc.

When introducing elements of the present disclosure or exemplary aspects or embodiment(s) thereof, the articles "a," "an," and "the" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method of addressing a projection system comprising the steps of:
    positioning a plasma-containing projection device at a predetermined location;
    positioning an electro-optical device at a predetermined location relative to the plasma-containing projection device, the electro-optical device operative to generate a write beam;
    activating the projection device by applying a voltage across the plasma-containing device to generate plasma in the plasma-containing device;
    generating the write beam;

directing the write beam to the plasma-containing projection device; and exclusively optically addressing information to the plasma-containing projection device via the write beam;

wherein the write beam is operative to cause a shift in the value of an index of refraction of a material in the plasma-containing projection device to thereby generate an image projected by the plasma-containing projection device.

2. The method of claim 1, wherein the plasma-containing projection device comprises a back reflective surface and a front reflective surface each having a reflectivity ranging from about 90% to about 95%.

3. The method of claim 2, wherein the electro-optical device is a laser.

4. The method of claim 2, further comprising generating pixels of an image at the front reflective surface of the plasma-containing projection device by exclusively optically addressing the plasma in the plasma-containing projection device with the write beam.

5. The method of claim 1, further comprising imprinting a pixelated array onto the plasma-containing projection device.

6. The method of claim 5, further comprising:

positioning a coherent beam source at a predetermined location relative to the plasma-containing projection device, the coherent beam source operative to generate a read beam;

directing the read beam to the plasma-containing projection device;

generating photonic excitation at predetermined pixel locations in the plasma-containing projection device; and assigning colors to pixel locations in the plasma-containing projection device.

7. The method of claim 1, further comprising:

generating photonic excitation at predetermined pixel locations in the plasma-containing projection device; and assigning colors to pixel locations in the plasma-containing projection device.

8. The method of claim 7, wherein generating photonic excitation at pixel locations in the plasma-containing projection device comprises not assigning, to pixels in a projected image, predetermined locations in the plasma-containing projection device.

9. A projection system comprising:

a plasma-containing projection device;

an electro-optical device positioned at a predetermined location relative to the plasma-containing projection device, the electro-optical device operative to generate a write beam; and a voltage source operative to provide voltage to the plasma-containing projection device;

wherein information is exclusively optically addressed to the plasma-containing projection device via the write beam by causing a shift in the value of an index of refraction of a material in the plasma-containing projection device to thereby generate an image projected by the plasma-containing projection device.

10. The system of claim 9, wherein exclusively optically addressing information to the plasma-containing projection device via the write beam is operative to generate pixels of an image projected by the plasma-containing projection device.

11. The system of claim 10, wherein the pixels of the projected image are not assigned predetermined locations in the plasma-containing projection device.

12. The system of claim 9 wherein the electro-optical device is a laser.

13. The system of claim 9, wherein the system is contained in a vehicle.

14. The system of claim 13 wherein the vehicle is selected from the group consisting of: a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface water borne vehicle, an unmanned surface water borne vehicle, a manned sub-surface water borne vehicle, and an unmanned sub-surface water borne vehicle.

15. The system of claim 9 wherein the plasma-containing projection device comprises a back reflective surface and a front reflective surface, each having a reflectivity ranging from about 90% to about 95%.

16. The system of claim 15, wherein the electro-optical device further comprises a prepixelated array imprinted on the plasma-containing projection device.

17. The system of claim 16 wherein information is exclusively optically addressed to the plasma-containing projection device via the write beam to generate photonic excitation at predetermined pixel locations in the plasma-containing projection device; and colors are assigned to pixels in the plasma-containing projection device.

* * * * *